US012718962B2

(12) United States Patent
Chung et al.

(10) Patent No.: US 12,718,962 B2
(45) Date of Patent: Aug. 25, 2026

(54) TRANSPORT BASKET FOR DEFECTIVE SPENT NUCLEAR FUEL OF HEAVY-WATER REACTOR

(71) Applicant: KOREA HYDRO & NUCLEAR POWER CO., LTD., Gyeongju-si (KR)

(72) Inventors: Sunghwan Chung, Daejeon (KR); Yongdeog Kim, Daejeon (KR); Kiyoung Kim, Daejeon (KR); Taehyeon Kim, Daejeon (KR); Donghee Lee, Daejeon (KR); Jinwon Son, Daejeon (KR); Dong-Gyu Lee, Anyang-si (KR); In-Su Jung, Daejeon (KR); Ke-Hyung Yang, Seoul (KR); Jae-Hun Ko, Sejong (KR); Duk-Woon Jung, Seongnam-si (KR)

(73) Assignee: Korea Hydro & Nuclear Power Co., Ltd., Gyeongju-si (KR)

( * ) Notice: Subject to any disclaimer, the term of this patent is extended or adjusted under 35 U.S.C. 154(b) by 617 days.

(21) Appl. No.: 18/249,740

(22) PCT Filed: Oct. 21, 2021

(86) PCT No.: PCT/KR2021/014817
§ 371 (c)(1),
(2) Date: Apr. 20, 2023

(87) PCT Pub. No.: WO2022/086222
PCT Pub. Date: Apr. 28, 2022

(65) Prior Publication Data

US 2024/0013943 A1 Jan. 11, 2024

(30) Foreign Application Priority Data

Oct. 22, 2020 (KR) ........................ 10-2020-0137315

(51) Int. Cl.
*G21F 5/012* (2006.01)
*G21F 5/12* (2006.01)
*G21F 5/14* (2006.01)

(52) U.S. Cl.
CPC ................ *G21F 5/012* (2013.01); *G21F 5/12* (2013.01); *G21F 5/14* (2013.01)

(58) Field of Classification Search
CPC ............. G21F 5/008; G21F 5/012; G21F 5/12
(Continued)

(56) References Cited

U.S. PATENT DOCUMENTS 9,514,853 B2 * 12/2016 Singh ........................ G21F 5/10
2006/0188054 A1 * 8/2006 Pennington ............... G21F 5/12 376/272

(Continued)

FOREIGN PATENT DOCUMENTS

JP 2014-228355 A 12/2014
JP 5808812 B2 11/2015

(Continued)

*Primary Examiner* — Michael Mccullough
(74) *Attorney, Agent, or Firm* — You & IP, LLC

(57) ABSTRACT

The present invention relates to a transport basket for defective spent nuclear fuel of a heavy water reactor and, more particularly, to a transport basket for defective spent nuclear fuel of a heavy water reactor that can reduce the burden of a personnel when handling spent nuclear fuel in a test facility by minimizing a storage space and maximizing a thickness such that only a predetermined amount of spent nuclear fuel for soundness evaluation in the test facility can be transported. To this end, provided is a transport basket for defective spent nuclear fuel of a heavy water reactor, comprising: a basket body having a storage space and an internal support that partitions the storage space; a fuel pocket that is installed on one side of each storage space partitioned through the internal support and is installed so as to be rotatable toward the other side of the storage space, and has (Continued)

a detachable groove open in an upward direction such that a fuel case containing the spent nuclear fuel can be detached therefrom; and a cover that opens and closes the storage space of the basket body and is screwed to the basket body.

6 Claims, 16 Drawing Sheets

(58) Field of Classification Search
USPC .......................................................... 376/272
See application file for complete search history.

(56) References Cited

U.S. PATENT DOCUMENTS

| | | | | |
|---|---|---|---|---|
| 2012/0008729 | A1* | 1/2012 | Chang | G21F 5/06 376/272 |
| 2013/0177124 | A1 | 7/2013 | Chassignet et al. | |
| 2017/0304767 | A1 | 10/2017 | Byrd | |
| 2018/0235417 | A1* | 8/2018 | Hayamitsu | F04D 25/0606 |

FOREIGN PATENT DOCUMENTS

| | | | |
|---|---|---|---|
| KR | 10-1169612 | B1 | 7/2012 |
| KR | 10-1558963 | B1 | 10/2015 |
| KR | 10-1778580 | B1 | 9/2017 |
| KR | 10-1959004 | B1 | 3/2019 |
| KR | 10-2139163 | B1 | 7/2020 |

* cited by examiner

TRANSPORT BASKET FOR DEFECTIVE SPENT NUCLEAR FUEL OF HEAVY-WATER REACTOR

TECHNICAL FIELD

The present disclosure relates to a transport basket for transporting defective spent nuclear fuel of a heavy water reactor and, more particularly, to a transport basket for transporting defective spent nuclear fuel of a heavy water reactor capable of safely handling predetermined spent nuclear fuel that is used for integrity evaluation also in a test facility.

BACKGROUND ART

In general, spent fuel refers to nuclear fuel material used as fuel for a nuclear reactor or nuclear fuel material that has undergone nuclear fission by other methods and is called high-level radioactive waste as contrasted with low- and intermediate-level radioactive waste from gloves, clothes, and the like of operators at nuclear power plants. Such spent fuel is no different from new fuel in appearance. However, such spent fuel has high radioactivity due to fission products having been generated during the nuclear fission reaction in the nuclear reactor and continuously generates heat even after the fission reaction is over. Therefore, such spent fuel is not to be allowed to come into direct contact with people when handled or stored and needs to be handled outside the shielding structure that blocks the radiation. Prior to final disposal in an underground landfill, such spent nuclear fuel is stored in a storage place in a state of being accommodated into a specially designed storage container. In this case, first, the spent nuclear fuel is kept in the Spent Fuel Bay (SFB) located inside the building and subjected to a long period of cooling, and only the spent nuclear fuel, which has been cooled in the SFB for more than 6 years and thus generates very little decay heat, is transported to and stored in a Spent Fuel Dry Storage Facility (SFDSF) outside the building. At this time, the spent nuclear fuel is transferred to the storage fuel basket (FB) provided by being made of stainless steel as shown in FIG. 1A through underwater work in the SFB, and the storage fuel basket (FB) containing 60 bundles of spent nuclear fuel assembly (FA) therein is moved to a Shielded Work Station (SWS) arranged on top of the SFB and dried with hot air. When the drying of the spent nuclear fuel is finished, a lid of the storage fuel basket (FB) is closed and seal welding is performed by remote operation. The storage fuel basket (FB) that is sealed is inserted into a Fuel Basket Transport Flask (FBTF) and then transported to a dry storage facility and stored (kept).

On the other hand, for integrity evaluation for continuous storage, the spent nuclear fuel stored in the dry storage facility of the nuclear power plant as described above is put into a transportation cask (CV) shown in FIG. 1B and is transported to a test facility such as Korea Atomic Energy Research (KAERI) and the like. Thereafter, an integrity test is performed for the spent nuclear fuel. That is, after the transportation cask (CV) is transported to the test facility, the operator withdraws the storage fuel basket (FB) from the transportation cask (CV), cuts the sealed and welded storage fuel basket (FB), and then withdraws one or two bundles of spent nuclear fuel assembly (FA), which are to be used for integrity evaluation, from the storage basket. Then, the bundles of spent nuclear fuel assembly (FA) withdrawn above are transported to an external research institute. Specifically, an operator transports the storage fuel basket (FB) stored in the SFDSF to a wet storage facility and cuts the storage fuel basket (FB) out in the SFB of the wet storage facility. In succession, the bundle of spent nuclear fuel assembly (FA) is withdrawn from the storage basket cut out, or the spent nuclear fuel rod are each withdrawn from the bundle of the spent nuclear fuel assembly (FA) that has been withdrawn. In succession, the bundle of the spent nuclear fuel assembly (FA) that has been withdrawn or each spent nuclear fuel rod is transported to an empty storage basket as shown in FIG. 1A, and then the storage basket is sealed and welded. Thereafter, the operator puts the storage fuel basket (FB) shown in FIG. 1A in the transportation cask (CV) shown in FIG. 1B and transports the transportation cask (CV) containing the storage fuel basket (FB) to the test facility.

However, when the spent nuclear fuel stored in the storage basket having the above configuration is transported to the test facility, there is a problem in that a series of processes are complicated and a lot of man-hours are required, resulting in low efficiency in transporting the spent nuclear fuel to the test facility. In particular, the storage fuel basket (FB) having the above configuration is made of a thin metal plate to secure the accommodation space due to the nature of the accommodation space in which 60 bundles of spent nuclear fuel are to be accommodated, and the transportation cask (CV) is made of a metal thick plate to supplement the thickness of the storage basket, therefore, there is a problem in that it is burdensome for the workforce of the test facility to handle the storage fuel basket (FB) withdrawn from the transport container CV. That is, in the process of withdrawing the spent nuclear fuel assembly (FA) by cutting the conventional storage fuel basket (FB) out by the operator of the test facility, the test facility is not equipped well enough with handling facilities compared with nuclear power plants, so there is a problem in that a series of taking-out operations such as cutting the storage basket is not easy. In addition, the test facility operator needs to be in direct proximity to the storage fuel basket (FB), so the test facility operator has a burdensome problem in handling spent nuclear fuel due to concerns about radiation exposure from the storage fuel basket (FB) made of thin plates.

DOCUMENTS OF RELATED ART

[Patent Document] Korean Patent No. 10-1169612

DISCLOSURE

Technical Problem

Accordingly, the present disclosure has been made keeping in mind the above problems occurring in the related art. Here, an objective of the present invention is to provide a transport basket for transporting defective spent nuclear fuel of a heavy water reactor that minimizes an accommodation space for spent nuclear fuel but maximizes a thickness of a basket body and lid as much as the accommodation space is reduced to reduce a handling burden of test facility personnel and screws to couple the basket body and lid to improve workability of taking out the spent nuclear fuel.

Technical Solution

In order to accomplish the above objectives, there may be provided a transport basket for transporting defective spent nuclear fuel of a heavy water reactor, the transport basket including: a basket body provided with an accommodation space and an internal support partitioning the accommodation space; a fuel pocket pivotably arranged in each side of the accommodation space partitioned by the internal support and provided with a groove opened upwards so as to allow a fuel case accommodating spent nuclear fuel to be detachably seated therein; and a lid screw-coupled to the basket body to open and close the accommodation space of the basket body.

At this time, the lid may be provided with a central through hole, the internal support may be provided with a hollow central post to be exposed to the outside of the lid through the central through hole, the central post may have the inside open through the central through hole, and the circumference of the central post may have exhaust holes through which the accommodation space and the inside of the central post communicate.

The basket body may be provided with a plurality of screw grooves provided on an upper rim thereof, and the lid may be provided with fastening holes for being fastened to the screw grooves, wherein the fastening hole may be an arc-shaped long hole provided in a circumferential direction of the lid.

In addition, the transport basket may further include a support arranged in the accommodation space for supporting the fuel pocket to be sloped in a pivot direction of the fuel pocket.

In addition, the transport basket may further include a shielding adapter provided with a seating groove having an inner diameter corresponding to an outer diameter of the basket body and a support portion to separate the seating groove from the ground, wherein the lid and the shielding adapter may be to be screw-fastened with each other.

In addition, the fuel case may include a guider having partition spaces partitioned into a plurality of spaces, thereby allowing the spent nuclear fuel to be accommodated in the partition space in a rod unit.

In addition, the internal support may be provided to be stepped downward in a depth direction of the accommodation space, and the lid may include: a fastening piece configured to be screw-fastened to a rim of the basket body; and a close contact protrusion provided to correspond to an inner diameter of the accommodation space of the basket body, protruding downward from a center of the lid to be in close contact with the internal support, and provided with the central through hole to allow the central post to be inserted therein.

Advantageous Effects

A transport basket for transporting defective spent nuclear fuel of a heavy water reactor according to the present invention has the following effects.

First, for the transport basket for transporting defective spent nuclear fuel of a heavy water reactor, an accommodation space of a basket body is minimized to minimize storage of spent nuclear fuel for the integrity test, but the thickness of the basket body and a lid is maximized as much as the accommodation space is reduced. That is, the integrity test requires only a predetermined amount of spent nuclear fuel, so the accommodation space of the basket body that can be transported to the test facility is reasonably realized. Accordingly, the present invention can maximize thickness of each of the basket body and a lid according to the reduction of the accommodation space, thereby minimizing the risk of radiation exposure. That is, the integrity test requires only a predetermined amount of spent nuclear fuel, so the accommodation space of the basket body that can be transported to the test facility is reasonably realized. Accordingly, the present invention can maximize thickness of each of the basket body and a lid according to the reduction of the accommodation space, thereby minimizing the risk of radiation exposure. As a result, there is an effect that can reduce burden of test personnel handling spent nuclear fuel even at a test facility that is not equipped well enough with handling facilities compared with nuclear power plants.

Second, the present invention can maximize the thickness of each of the basket body and the lid. So, by providing a screw-fastening configuration instead of seal welding the basket body and the lid, there is an effect that the spent nuclear fuel can be easily withdrawn from the basket body.

Third, the present invention provides a screw-fastening configuration between the lid and the basket body, but configures the fastening hole formed in the lid as a long hole, thereby providing an effect of increasing convenience for adjusting the screw-fastening position.

Fourth, in the present invention, a central post provided in the center of the basket body is configured as a hollow tube, and an exhaust hole communicating with the accommodation space of the basket body is provided in the central post. Accordingly, there is an effect that can dry the accommodation space outside the basket body in a state in which the accommodation space of the basket body is not opened.

Fifth, the present invention provides a guider having a plurality of partition spaces partitioned in a fuel case in which individual spent nuclear fuel, in a rod unit, is accommodated, thereby providing an effect that can accommodate not only the spent nuclear fuel in, a bundle unit, but also the spent nuclear fuel, in a rod unit, in a manner not to flow.

BEST MODE

Terms or words used in the present specification and claims are not limited to usual or dictionary meanings and, on the basis of a principle that the inventor may properly define a concept of a term in order to explain his or her invention in the best way, should be interpreted as meaning and concept consistent with the technical spirit of the present invention.

Hereinafter, with reference to FIGS. 2 to 17 attached, a description will be given of a transport basket for transporting defective spent nuclear fuel of a heavy water reactor according to an exemplary embodiment of the present invention (hereinafter referred to as "transport basket").

The transport basket is a device for transporting spent nuclear fuel to a test facility, wherein an accommodation space is reduced to accommodate only the predetermined amount of spent fuel required for the integrity test due to the nature of the test facility for testing the integrity of the spent nuclear fuel, but a thickness is maximized as much as the space is reduced. As a result, the transport basket has a technical feature that reduces the burden of handling spent nuclear fuel even in a test facility that is not equipped well enough with handling facilities compared with nuclear power plants.

As shown in FIGS. 2 to 5, the transport basket includes a basket body 100, a fuel pocket 200, a lid 300, and a shielding adapter 400.

Figure 1A:
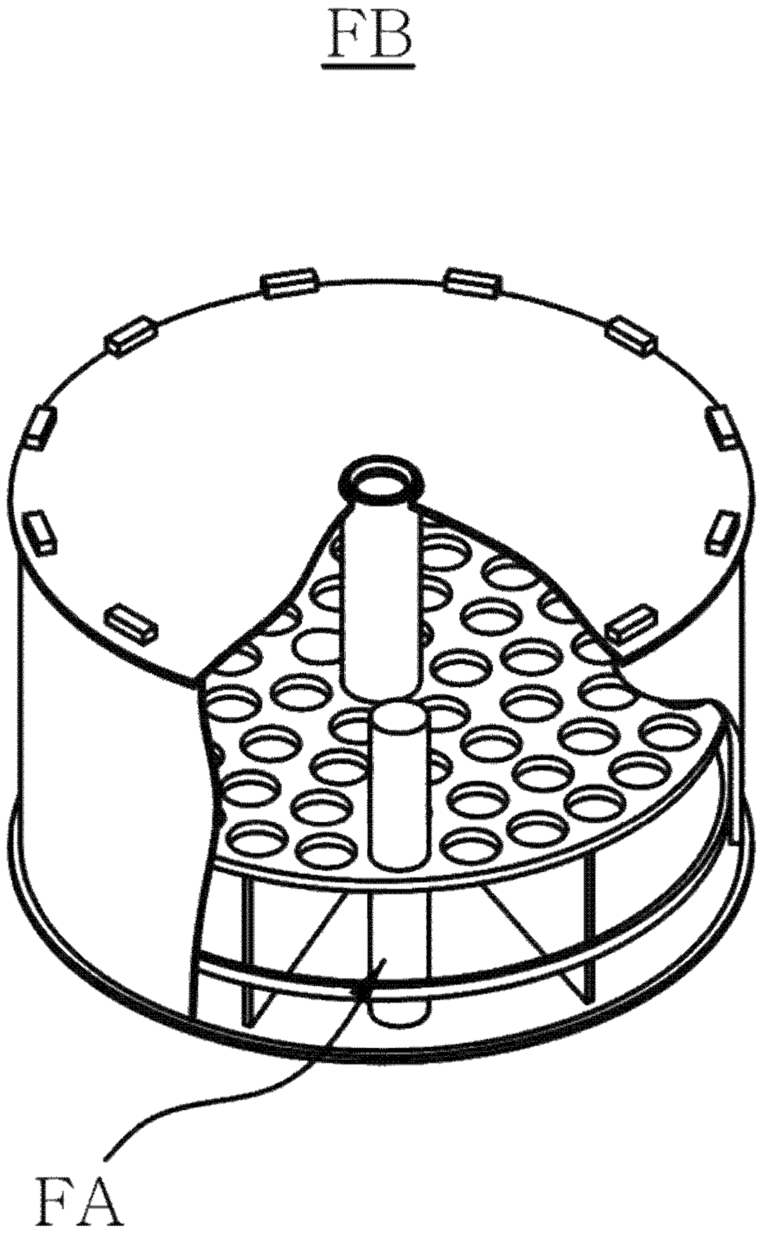
FIG. 1A is partially cutaway perspective view showing a storage basket into which bundles of spent nuclear fuel are to be loaded, the perspective view showing a portion of the storage basket in a state in which only one bundle of spent nuclear fuel to be tested is loaded is cut away.
Figure 1B:
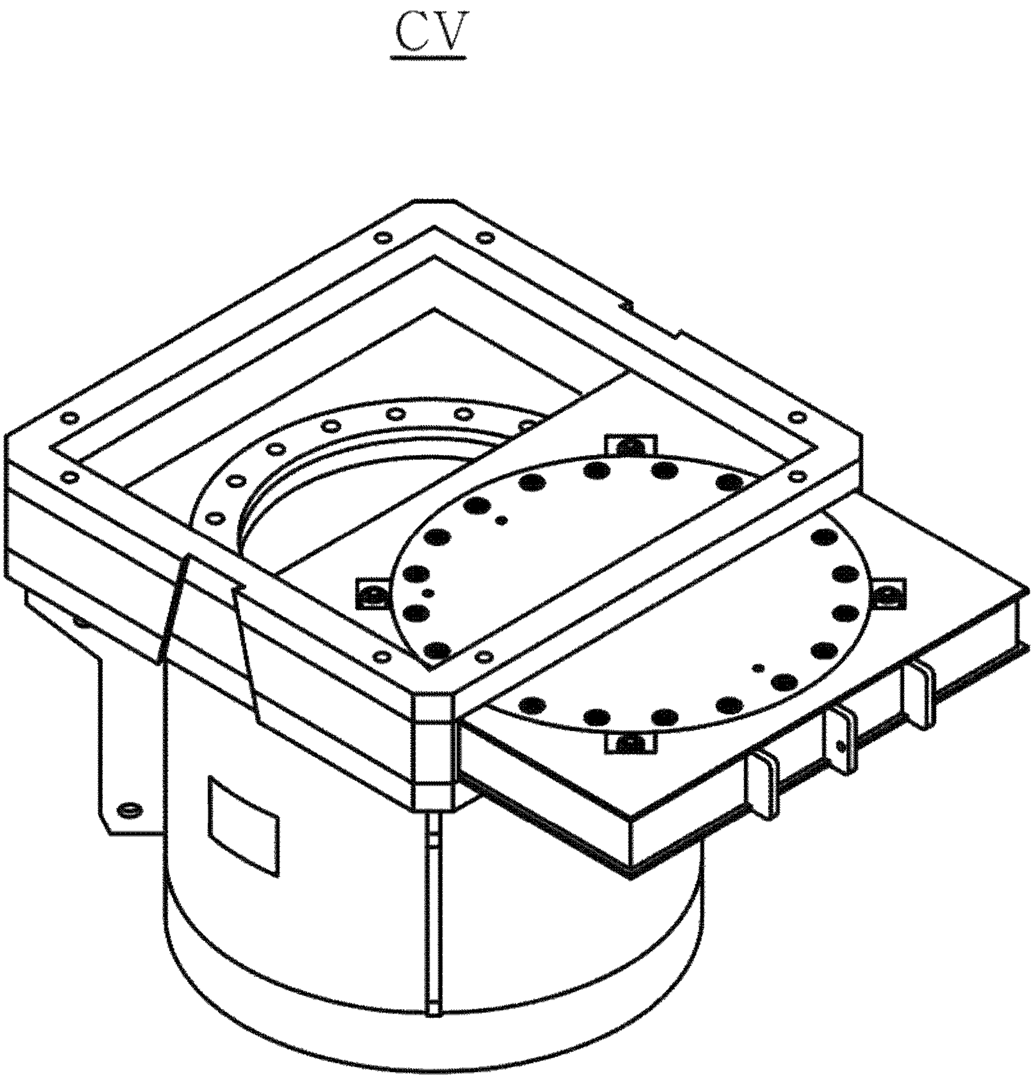
FIG. 1B is a view showing a transportation cask for transporting a storage basket loaded with bundles of spent nuclear fuel.
Figure 2:
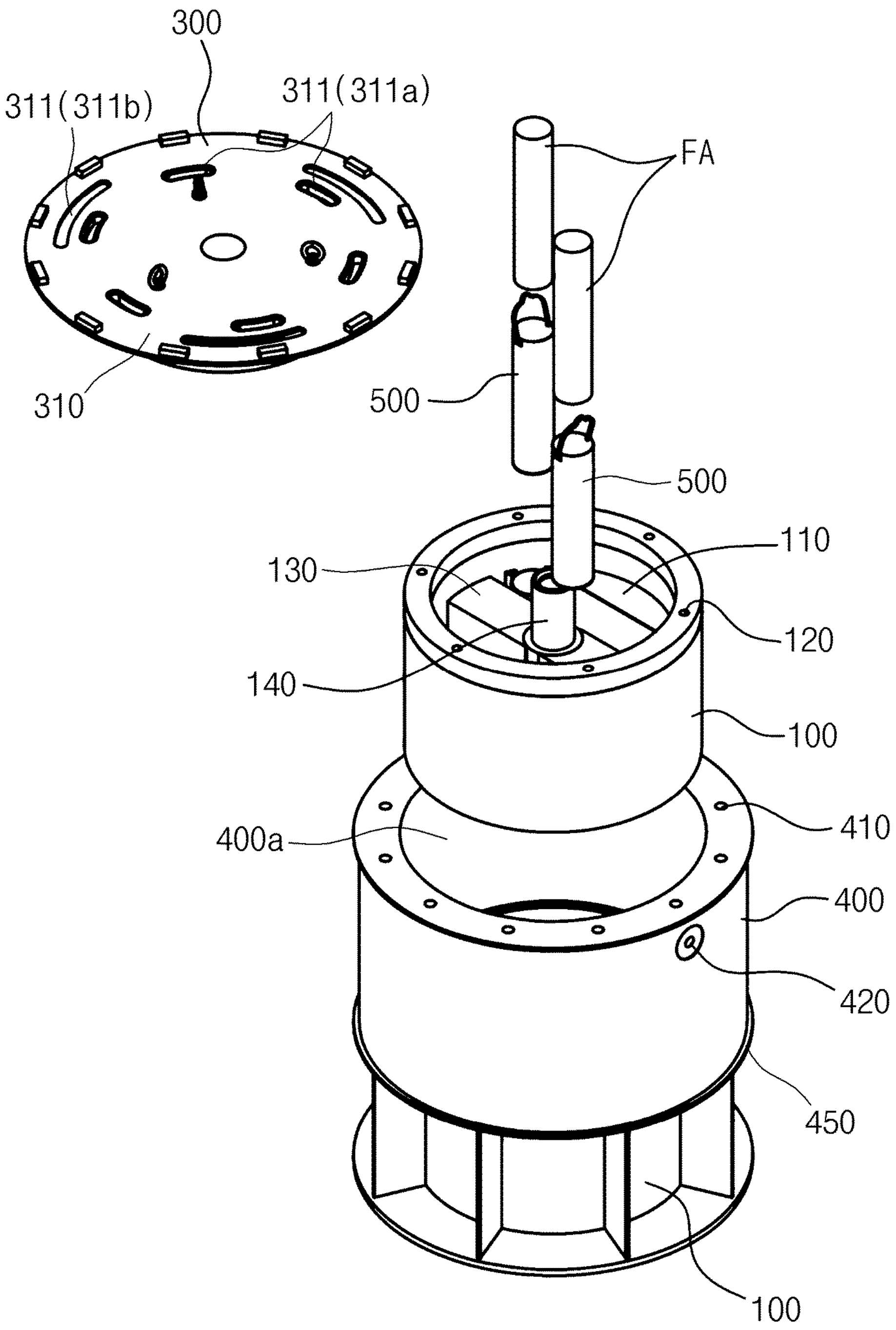
FIG. 2 is an exploded perspective view showing a transport basket for transporting defective spent nuclear fuel of a heavy water reactor according to an exemplary embodiment of the present invention.
Figure 4:
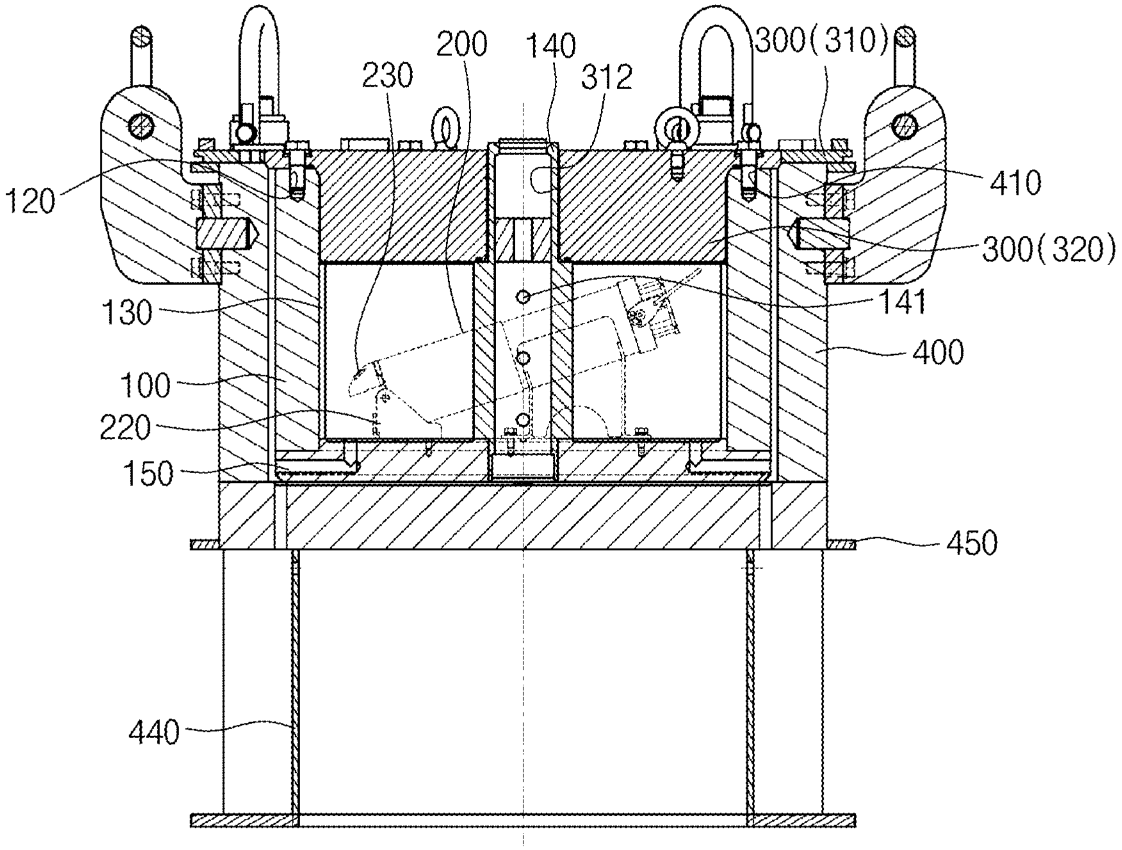
FIG. 4 is a sectional view showing the transport basket for transporting defective spent nuclear fuel of a heavy water reactor according to the exemplary embodiment of the present invention.

The basket body 100 is configured to accommodate a fuel case 500 in which a spent nuclear fuel assembly (FA), a subject of soundness integrity evaluation, is accommodated, and is provided with an accommodation space 110 in which the fuel case 500 may be accommodated. The basket body 100 may be provided in a circular shape and has a plurality of screw grooves 120 provided on an upper rim thereof, as shown in FIG. 2. The screw grooves 120 are configured to screw-fasten with the lid 300 to be described later. The basket body 100 is provided to minimize the size of the accommodation space 110 and to maximize the thickness of the basket body 100 in response to minimizing the size of the accommodation space 110. That is, the accommodation space 110 of the basket body 100 is large enough as long as only the predetermined spent nuclear fuel assembly (FA), the subject of the integrity test, is accommodated, so the size of the accommodation space 110 does not need to be unnecessarily large. Accordingly, it is possible to allow the thickness of the basket body 100 to be maximized as much as the size of the accommodation space 110 is reduced. At this time, the accommodation space 110 may be partitioned by the internal support 130. The accommodation space 110 is partitioned into opposite sides with respect to the internal support 130, and one fuel case 500 is accommodated in each partitioned accommodation space 110. The internal support 130 may be provided at a position stepped downward from an upper edge of the basket body 100. A central post 140 is arranged on the internal support 130, configured to be coupled to the lifting equipment of the power plant, and in the present invention, configured to serve also to supply hot air to the accommodation space 110 of the basket body 100 so as to be able to dry same. The central post 140 is arranged in the center of the internal support 130 and, as shown in FIG. 4, is provided in a form of a hollow pipe opening upward. At this time, a plurality of exhaust holes 141 is provided in the central post 140. With this configuration, in the basket body 100, hot air may be allowed to be received through the upper part of the central post 140 and discharged to the accommodation space 110 through the exhaust hole 141 so that, even when the accommodation space 110 is blocked by the lid 300, drying of the accommodation space 110 may be established. Meanwhile, drain holes 150 are provided at the bottom of the basket body 100.

Figure 5:
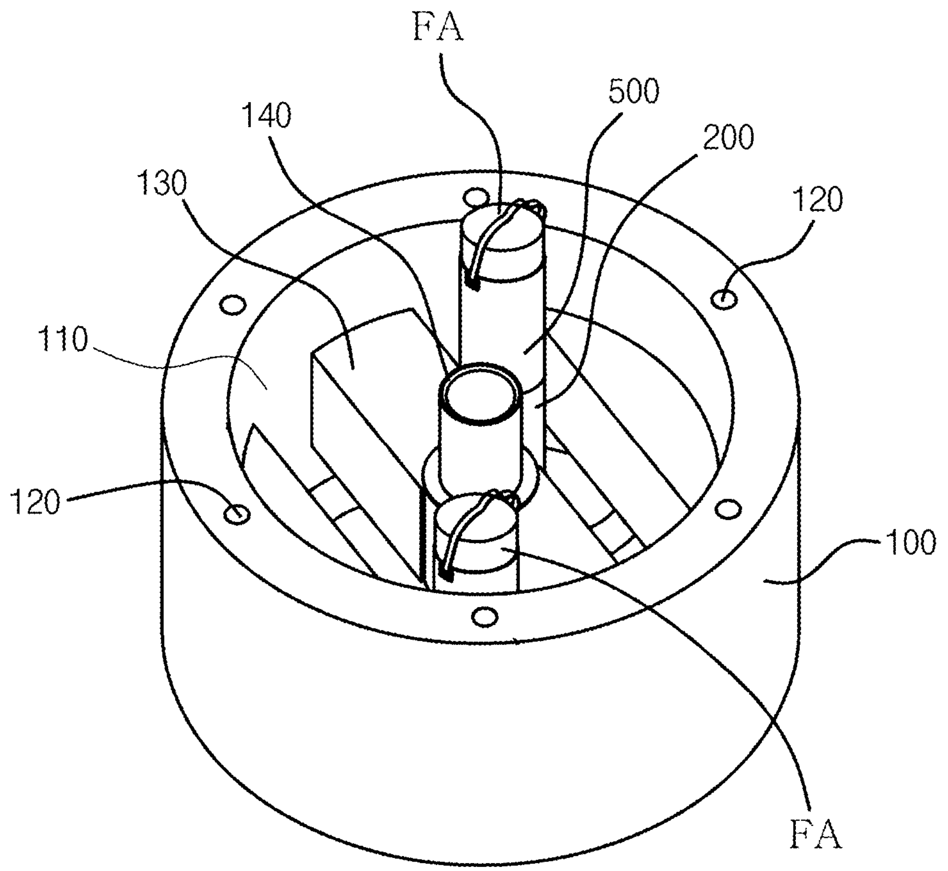
FIG. 5 is a perspective view showing a basket body of the transport basket for transporting defective spent nuclear fuel of a heavy water reactor according to the exemplary embodiment of the present invention.
Figure 6:
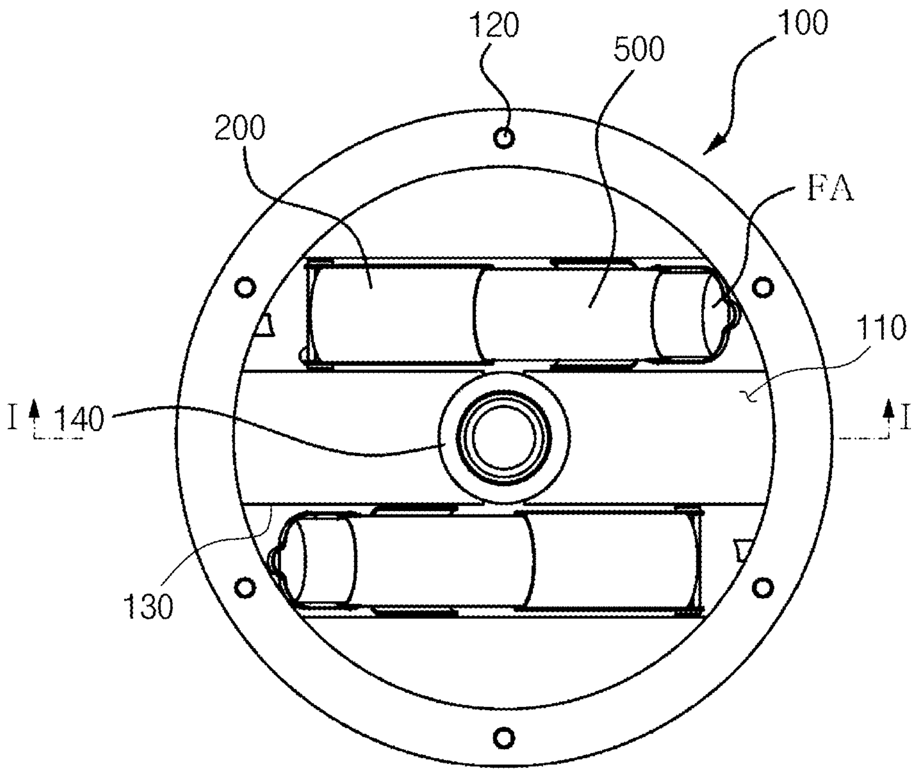
FIG. 6 is a plan view showing the basket body of the transport basket for transporting defective spent nuclear fuel of a heavy water reactor according to the exemplary embodiment of the present invention.
Figure 7:
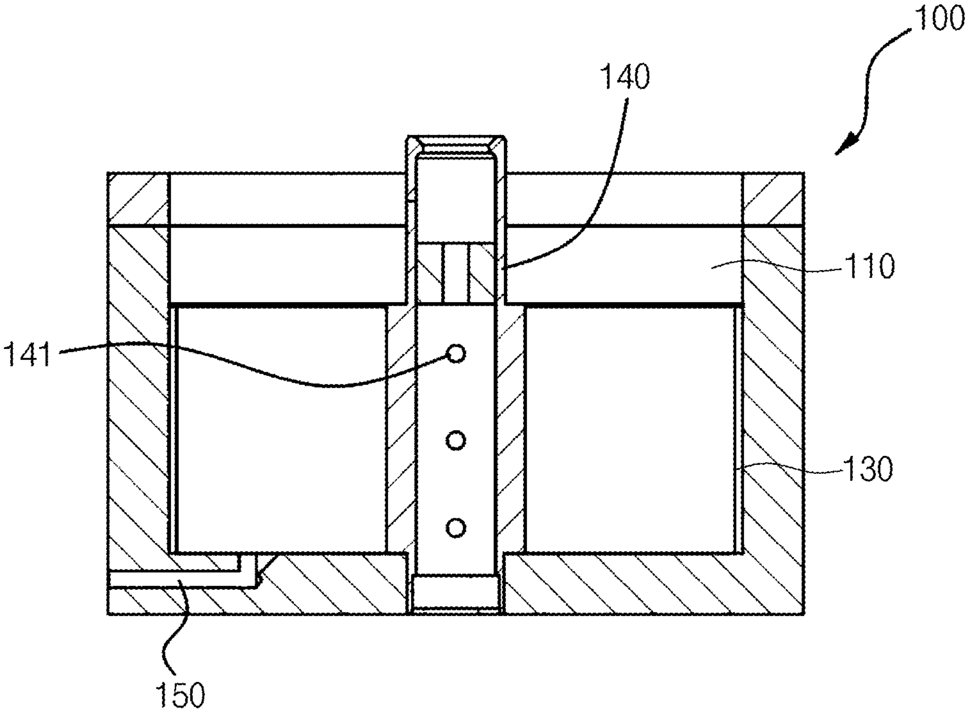
FIG. 7 is a sectional view taken along the line I-I in FIG. 6.
Figure 8:
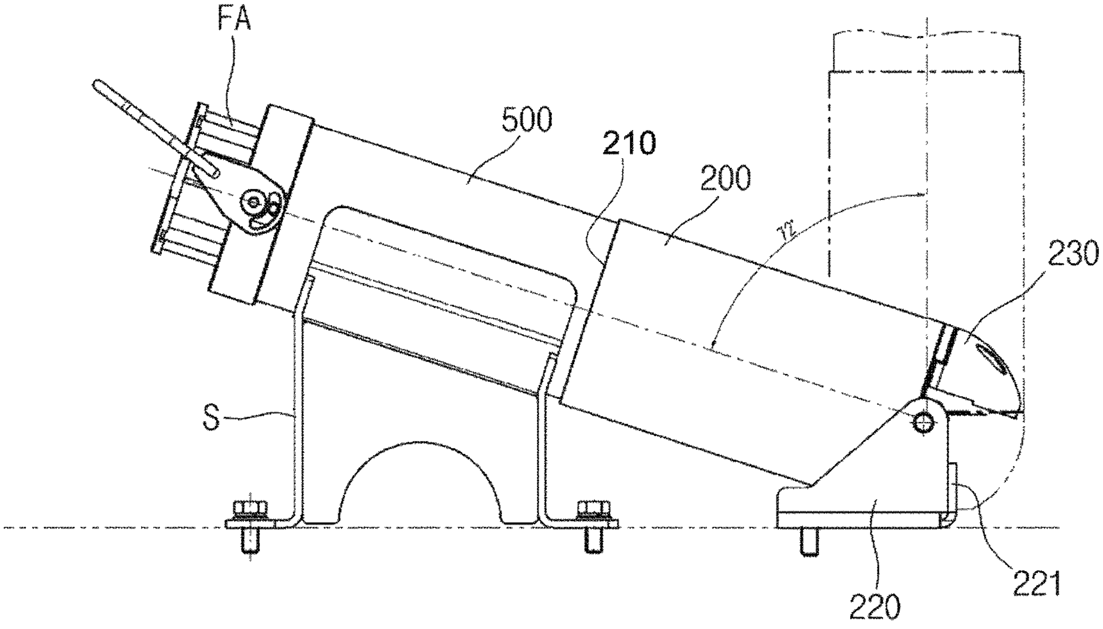
FIG. 8 is a side view showing a state in which a fuel case is inserted into a fuel pocket of the transport basket for transporting defective spent nuclear fuel of a heavy water reactor according to the exemplary embodiment of the present invention and supported on a support.
Figure 9:
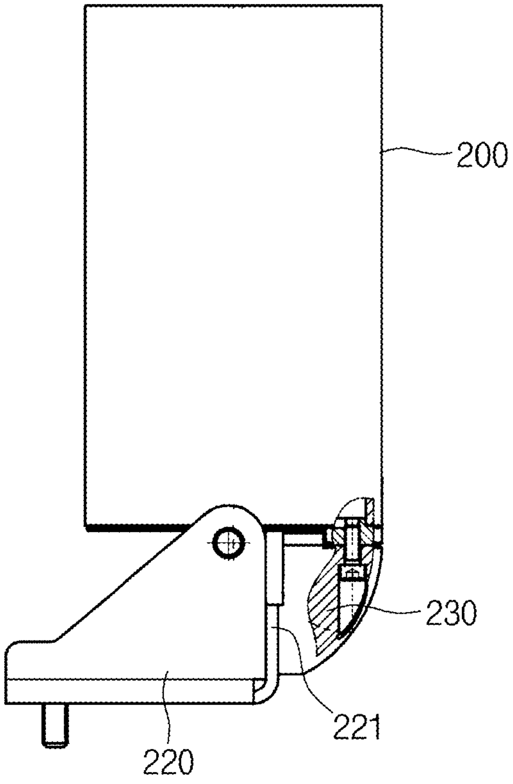
FIG. 9 is a side view showing a state in which the fuel pocket of the transport basket for transporting defective spent nuclear fuel of a heavy water reactor according to the exemplary embodiment of the present invention is vertically erected with respect to the bracket by weight of a weight.
Figure 10:
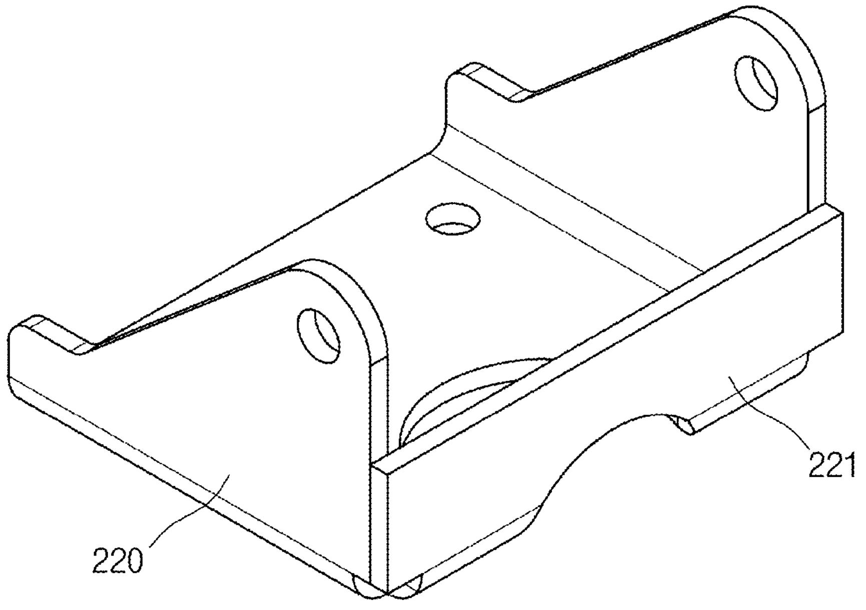
FIG. 10 is a perspective view showing a bracket to which the transport basket for transporting defective spent nuclear fuel of a heavy water reactor according to the exemplary embodiment of the present invention is to be shaft-coupled.

The fuel pocket 200 is a mediating means for accommodating the fuel case 500 in the accommodation space 110 and, as shown in FIGS. 5 and 6, arranged on the accommodation space 110 on each of opposite sides with respect to the internal support 130. The fuel pocket 200 is provided with a groove 210 for detaching the fuel case 500, and the groove 210 opens toward an upper side of the fuel pocket 200. The fuel pocket 200 is hinged so as to be pivoted in the accommodation space 110 as shown in FIGS. 4 and 8 to 10. As described above, only a predetermined amount of spent nuclear fuel assembly (FA) is needed to be stored in the basket body 100, and the overall thickness of the basket body 100 may be increased in response thereto. As a result, the size of the accommodation space 110 is reduced, but the efficiency of the accommodation space 110 may be increased by tilting the fuel case 500 in the accommodation space 110. As shown in FIGS. 8 and 9, the fuel pocket 200 is shaft-coupled to a bracket 220, wherein a weight 230 may be arranged on one side of the bottom of the fuel pocket 200. The weight 230 is provided to be biased to one side of the fuel pocket 200, so that the fuel pocket 200 may always be set up vertically with respect to the bracket 220. The fuel pocket 200 is always upright due to the weight 230, so the groove also always faces upward. Accordingly, the operator may easily insert the fuel case 500 into the fuel pocket 200. At this time, a stopper 221 may be arranged on the bracket 220 as shown in FIG. 10. The stopper 221 is configured to maintain the vertical angle of the fuel pocket 200 by restricting excessive rotation of the fuel pocket 200 in a process that the fuel pocket 200 is vertically erected by the weight 230. That is, the weight is interfered with the stopper 221 as shown in FIG. 9 in the process that the fuel pocket 200 rotates vertically, so the fuel pocket 200 may always maintain a vertical state. On the other hand, the fuel pocket 200 accommodates the fuel case 500 as described above and, when the fuel case 500 is accommodated in the groove 210, rotates automatically by the weight of the fuel case 500 as shown in FIG. 8. At this time, a support S configured to support the fuel case 500 stored in the fuel pocket 200 is arranged on one side of the fuel pocket 200, wherein the support S is provided with a support groove having a curvature corresponding to the curvature of the fuel case 500. In addition, as shown in FIGS. 5 and 6, each of the fuel pockets 200 may be pivotably arranged in each side of the accommodation spaces 110, but each fuel pocket 200 may even be pivotably arranged in the same direction as each other.

Figure 3:
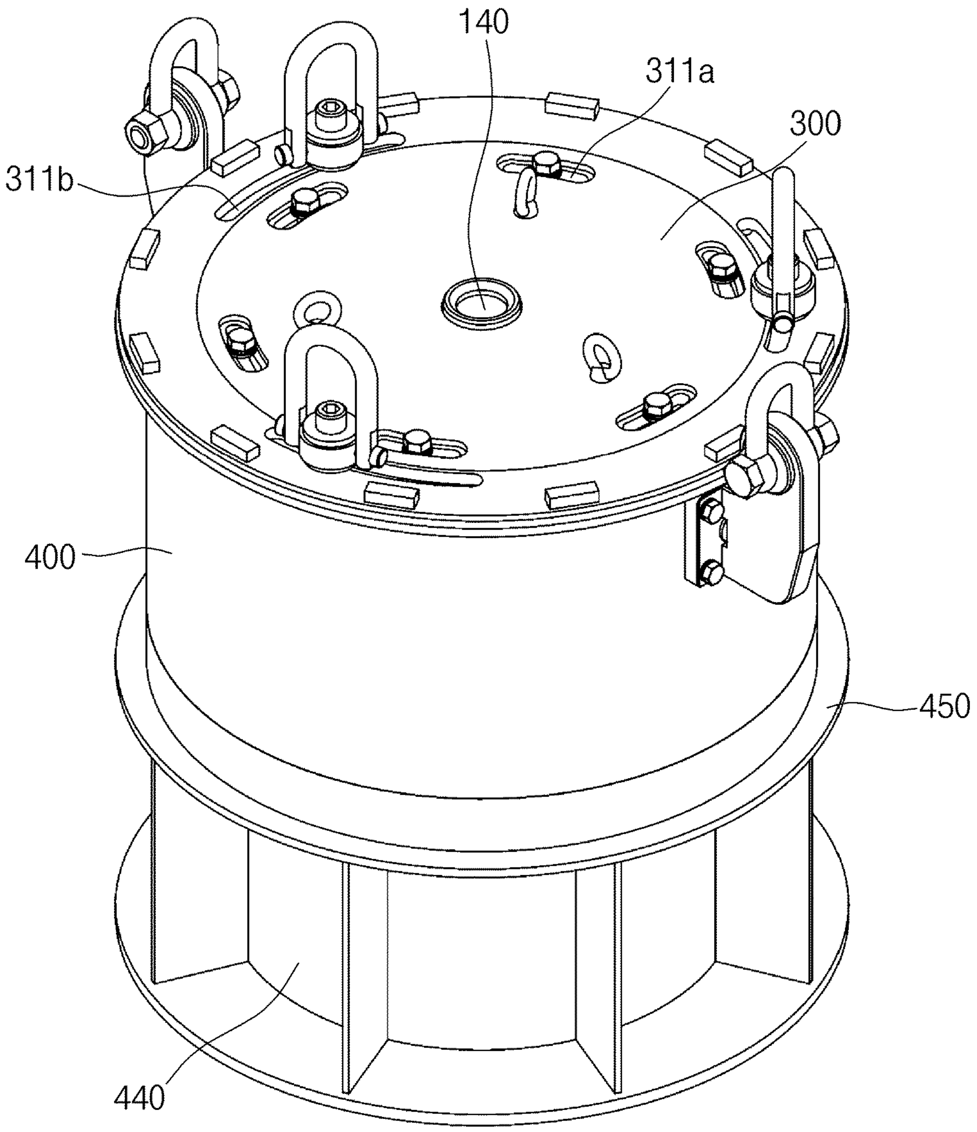
FIG. 3 is a perspective view showing the transport basket for transporting defective spent nuclear fuel of a heavy water reactor according to the exemplary embodiment of the present invention.
Figure 11:
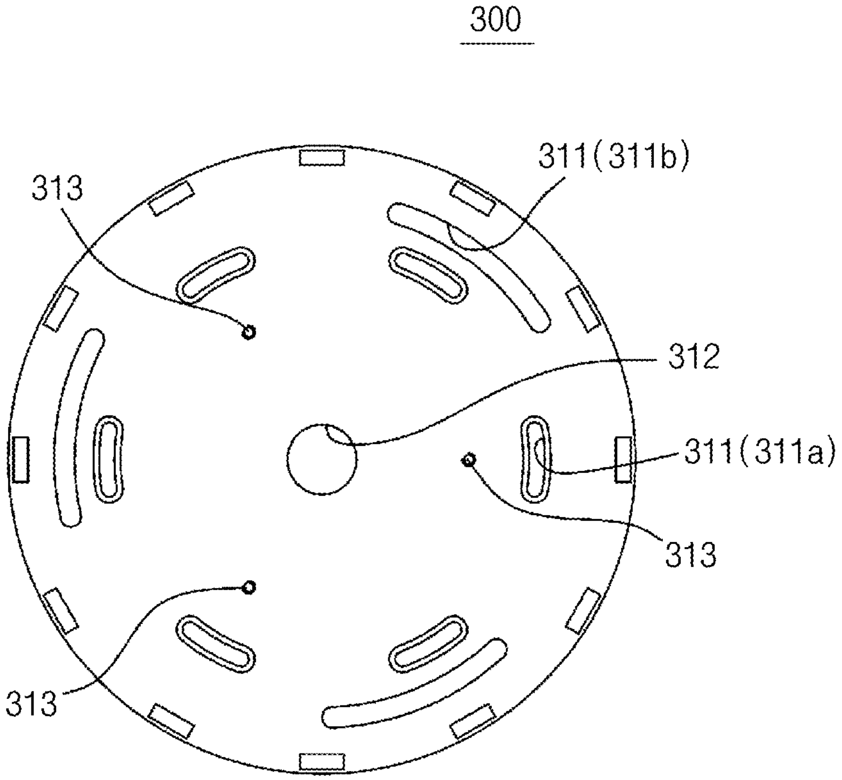
FIG. 11 is a plan view showing a lid of the transport basket for transporting defective spent nuclear fuel of a heavy water reactor according to the exemplary embodiment of the present invention.
Figure 12:
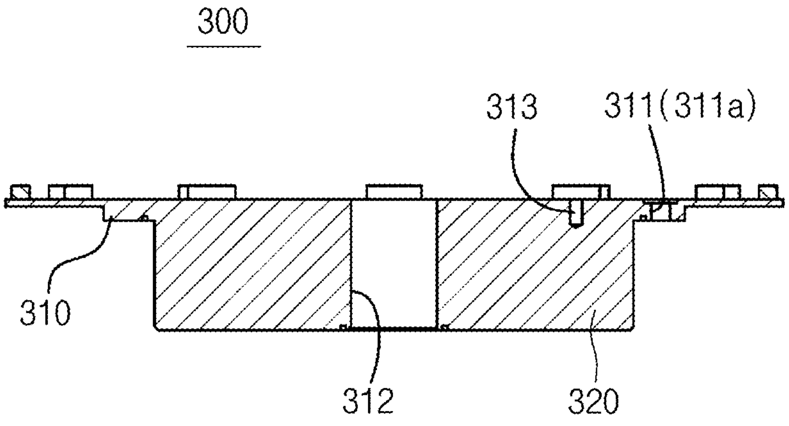
FIG. 12 is a sectional view showing the lid of the transport basket for transporting defective spent nuclear fuel of a heavy water reactor according to the exemplary embodiment of the present invention.

As shown in FIGS. 3 and 4, the lid 300 opens and closes the accommodation space 110 of the basket body 100 and is detachable from the shielding adapter 400. As shown in FIG. 11, the lid 300 is provided in a circular shape, and the diameter of the lid 300 corresponds to the diameter of the shielding adapter 400. The cover 300 includes a flange 310 fastened to the basket body 100 and the shielding adapter 400; and a close contact protrusion 320 protruding downward from the center of the flange 310 as shown in FIG. 12. As shown in FIG. 11, the flange 310 is provided with fastening holes 311 and a central through hole 312. The fastening holes 311 are configured to be screw-fastened into the screw grooves provided in the shielding adapter 400 to be described later and the basket body 100 with fastening bolts passing therethrough, respectively, and includes first fastening holes 311*a* corresponding to the screw grooves 120 of the basket body 100 and second fastening holes 311*b* corresponding to the screw groove of the shielding adapter 400. The fastening holes 311 are made of long holes and have arc shapes having a curvature in the circumferential direction of the lid 300, respectively. Accordingly, the fastening holes 311 may easily correspond to the positions of the screw grooves provided in the basket body 100 and the shielding adapter 400, respectively, when the lid 300 is fastened, so the operator's work convenience may be improved. In addition, the central through hole 312 is provided through the close contact protrusion 320 as shown in FIG. 12. The central through hole 312 corresponds to the central post 140 and is provided so that the central post 140 may be inserted thereinto. That is, an inner conduit of the central post 140 may be exposed to the outside of the basket body 100 through the central through hole 312. In addition, a plurality of lifting bolt holes 313 is provided in the flange 310.

Figure 13:
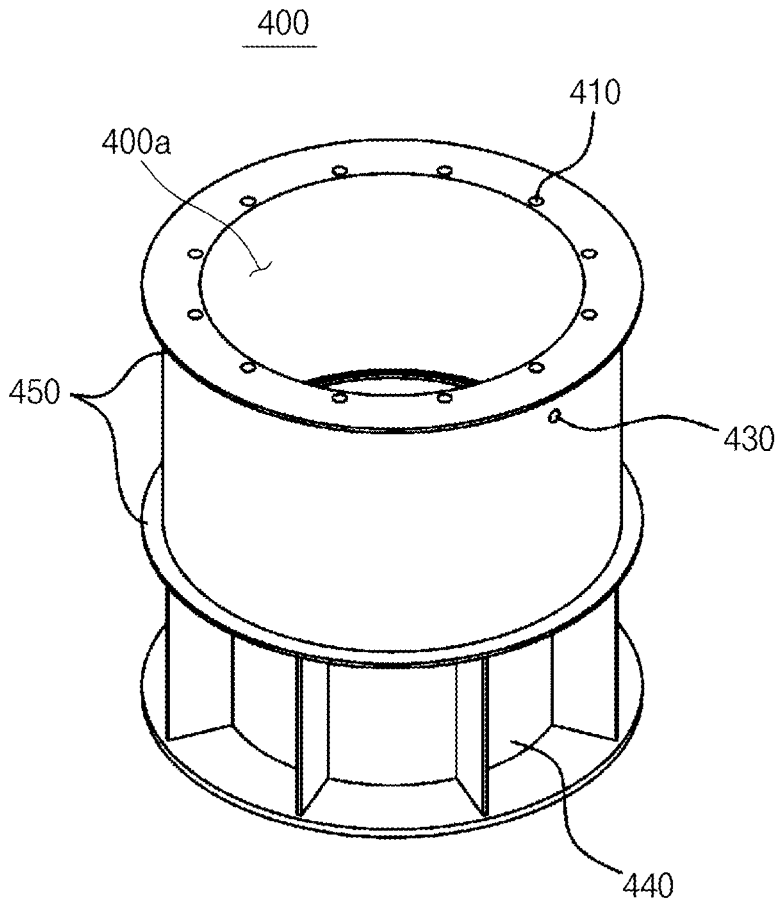
FIG. 13 is a perspective view showing a shielding adapter of the transport basket for transporting defective spent nuclear fuel of a heavy water reactor according to the exemplary embodiment of the present invention.
Figure 14:
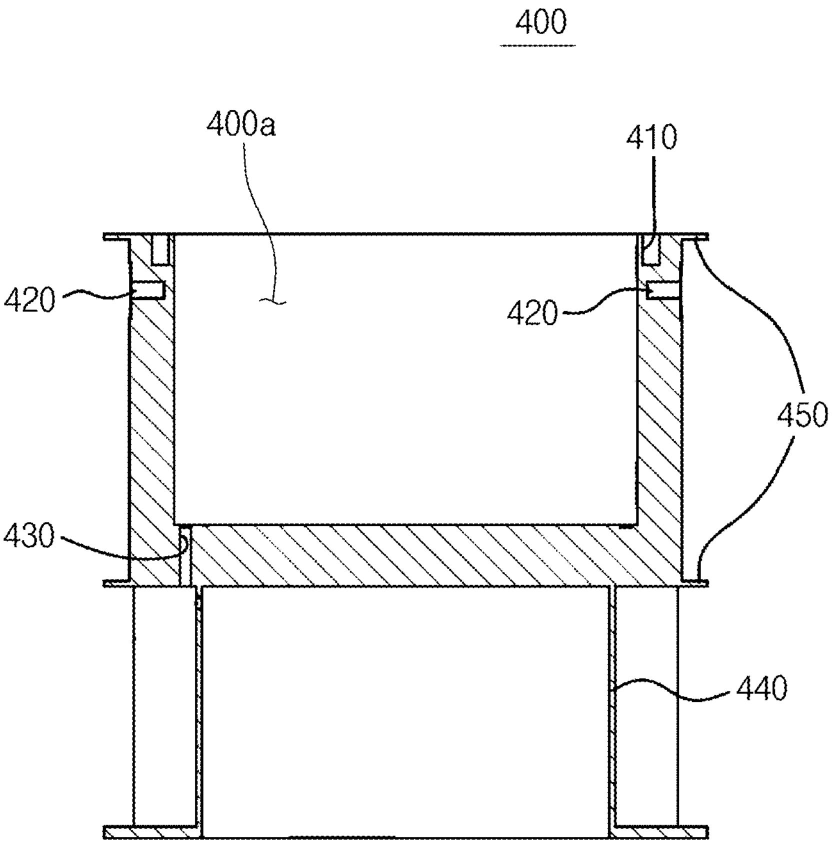
FIG. 14 is a sectional view showing the shielding adapter of the transport basket for transporting defective spent nuclear fuel of a heavy water reactor according to the exemplary embodiment of the present invention.

The shielding adapter 400 is provided with a seating groove 400*a* configured to accommodate the basket body 100 and configured to be accommodated in the transportation cask (CV) shown in FIG. 2 to be transported to a test facility. The shielding adapter 400 may shield radiation and heat emitted from the spent nuclear fuel assembly (FA) along with the basket body 100, so spent nuclear fuel (FA) may be safely transported, and the burden of handling spent fuel by test personnel may be minimized even in a test facility with insufficient handling facilities. The thickness of the shielding adapter 400 plus the thickness of the basket body 100 may correspond to the thickness of the transportation cask (CV). As shown in FIG. 13, the shielding adapter 400 has a plurality of screw grooves 410 provided along an upper rim thereof, wherein the screw grooves 410 correspond to the second fastening holes 311*b*. Lifting bolt holes 420 for lifting are provided on a circumference of the shielding adapter 400, and drain holes 430 are provided as shown in FIG. 14. As shown in FIG. 4, the drain hole 430 is configured to drain water drained from the drain hole 150 of the basket body 100 out of the shielding adapter 400. On the other hand, the shielding adapter 400 is transported to the test facility through the transportation cask (CV) as described above and is manufactured to fit the internal space of the normalized standard-size transportation cask (CV). To this end, the shielding adapter 400 is provided with a support portion 440 provided to be extending downward and an extension piece 450 provided to be extending in a circumferential direction.

Figure 15:
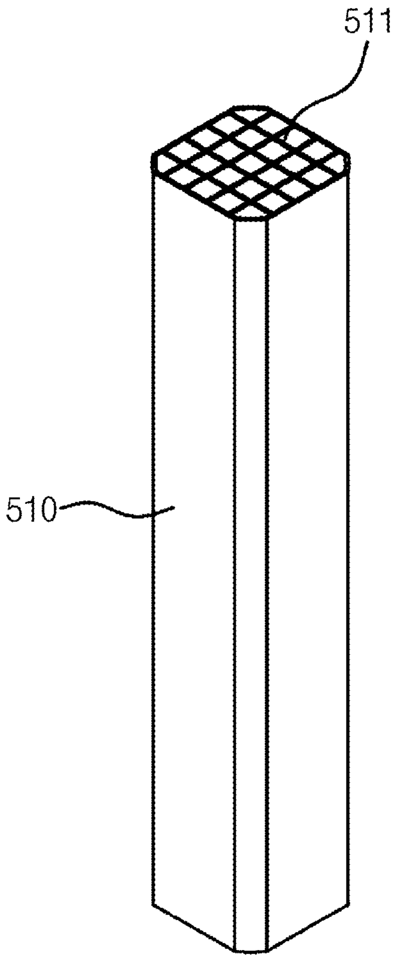
FIG. 15 is a perspective view showing a guider of the transport basket for transporting defective spent nuclear fuel of a heavy water reactor according to the exemplary embodiment of the present invention.
Figure 16:
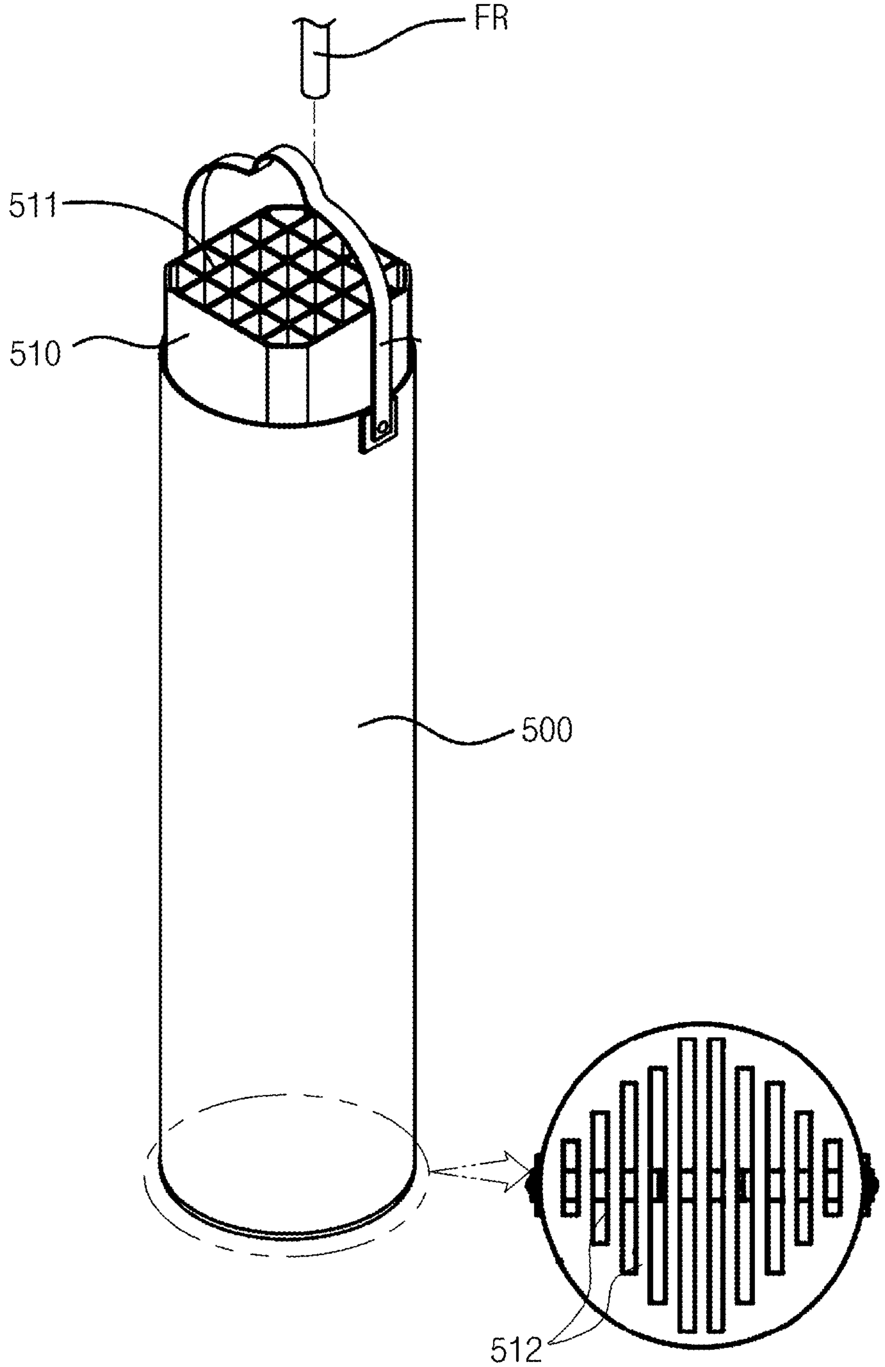
FIG. 16 is a perspective view showing a state in which the guider of the transport basket for transporting defective spent nuclear fuel of a heavy water reactor according to the exemplary embodiment of the present invention is inserted into the fuel case.

Meanwhile, the fuel case 500 may further include a guider 510 as a configuration for accommodating spent nuclear fuel assembly (FA), which is a test subject as shown in FIG. 15, wherein the guider 510 is provided with a plurality of compartmental spaces 511. The guider 510 may accommodate spent nuclear fuel assembly (FA), in a rod unit, in the fuel case 500 by being provided with the compartmental spaces 511. That is, as shown in FIG. 16, the guider 510 is provided to be detachable from the fuel case 500 and provided to accommodate spent nuclear fuel assembly (FA), in a rod unit, individually. The partitioned spaces 511 may be provided in a grid shape, but is not limited thereto. In addition, drain holes 512 are provided at the bottom of the fuel case 500.

Hereinafter, a process of accommodating spent nuclear fuel, subjects of a soundness integrity test and evaluation, in a transport basket configured as described above will be described.

The operator in the power plant withdraws the storage fuel basket (FB) from the dry storage facility, cuts the same in a spent fuel bay of the wet storage facility, and then withdraws the spent nuclear fuel assembly (FA) from the storage fuel basket (FB). Thereafter, as shown in FIGS. 2 and 5, the operator accommodates the spent nuclear fuel into the fuel case 500 and then mounts the fuel case 500 in which the spent nuclear fuel has been accommodated into the fuel pocket 200. As shown in FIG. 9, an initial fuel pocket 200 is provided to be a vertically upright state in the accommodation space 110 by the weight 230, and as the operator inserts the fuel case 500 into the groove 210 of the fuel pocket 200, the fuel pocket 200 loses its center in the bracket 220 due to the weight of the fuel case 500, which is heavier than the weight 230. As a result, as shown in FIGS. 4, 6, and 8, the fuel pocket 200 is tilted by turning from one side to an opposite side of the accommodation space 110. At this time, the fuel case 500 is supported on the support S. Thereafter, the operator makes the first fastening holes 311*a* of the lid 300 correspond to the screw grooves 120 of the basket body 100 and then screw-couples the lid 300 to the basket body 100 using fastening bolts. At this time, the central post 140 is in a state of being exposed toward the outside of the lid 300 through the central through hole 312. At this time, as shown in FIG. 4, the second fastening holes 311*b* of the lid 300 correspond to the screw grooves 410 of the shielding adapter 400, respectively, and the close contact protrusion 320 of the lid 300 is brought into close contact with an internal support 130. Thereafter, the operator screw-couples the lid 300 to the shielding adapter 400 with fastening bolts, thereby completing the storage of the spent nuclear fuel assembly (FA) in the transport basket as shown in FIG. 3.

Thereafter, the operator connects the lifting equipment to the lifting ring coupled to the lid 300 and lifts the transport basket from the spent fuel bay to place the same in the workplace. At this time, the water inside the transport basket is drained through the drain holes 150 and 512, and the operator injects hot air through the central post 140 to dry the inside of the transport basket.

Figure 17:
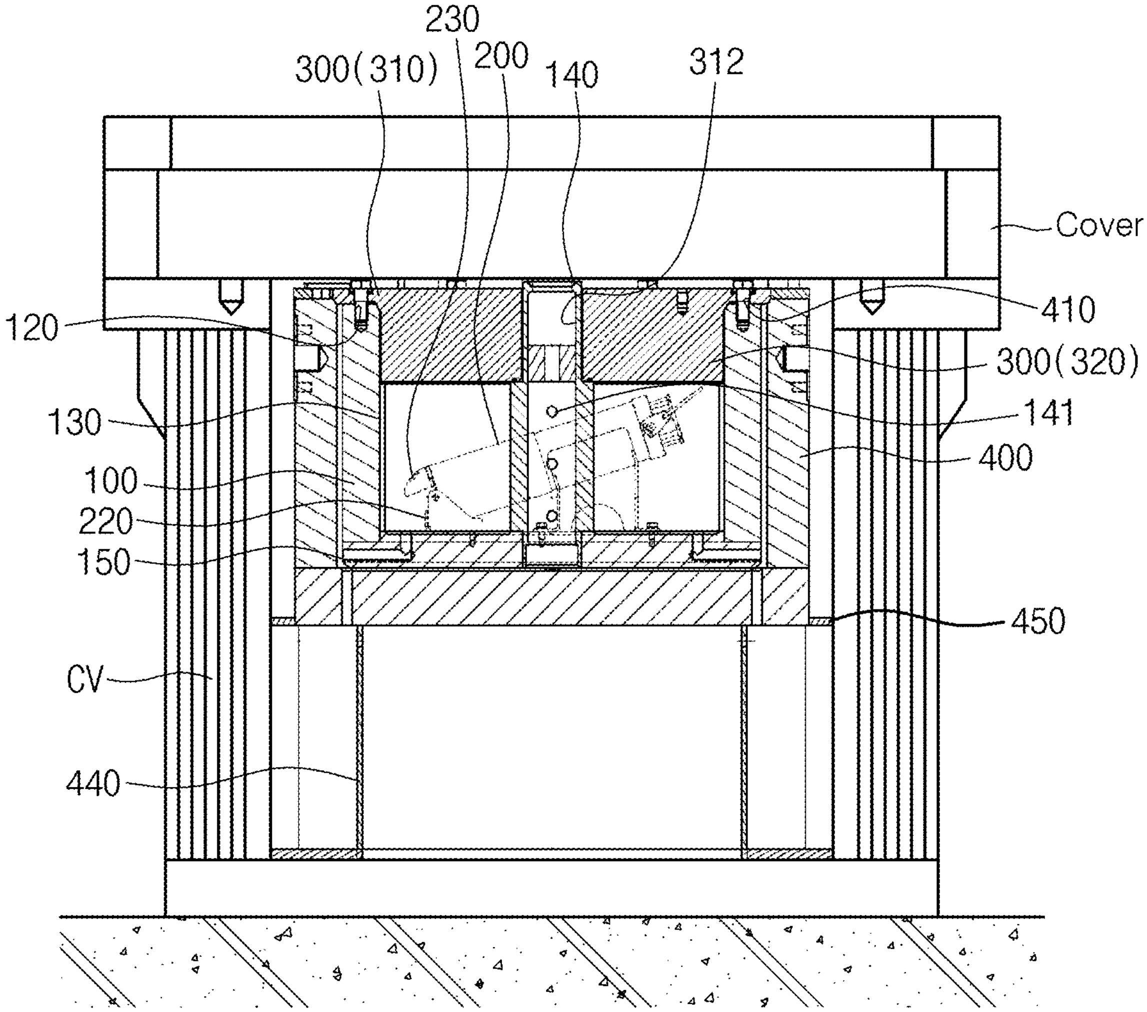
FIG. 17 is a sectional view showing a state in which the transport basket for transporting defective spent nuclear fuel of a heavy water reactor according to the exemplary embodiment of the present invention is accommodated in a transportation cask.

Thereafter, as shown in FIG. 17, the operator accommodates the transport basket in the transportation cask (CV) and covers the transportation cask (CV) with a lid to seal the transport basket. Thereafter, provided the operator transports the transportation cask (CV) to the test facility, the test personnel withdraw the spent fuel from the transportation cask (CV) and performs integrity evaluation. At this time, the spent nuclear fuel assembly (FA) is shielded by the basket body 100, the shielding adapter 400, and the transportation cask (CV), so test personnel may reduce the burden of handling due to concerns about radiation exposure.

As described so far, the transport basket for transporting defective spent nuclear fuel of a heavy water reactor according to the present invention is configured to be able to transport only a predetermined amount of spent nuclear fuel for the purpose of the integrity evaluation of the spent nuclear fuel, wherein the transport basket may have the accommodation space minimized and the thickness maximized, thereby allowing the burden of handling spent nuclear fuel by test facility personnel to be minimized even in test facilities that are poorly prepared for professional handling equipment.

Although the present invention has been described in detail with respect to the described embodiments, it is obvious to those skilled in the art that various changes and modifications are possible within the scope of the technical idea of the present invention and natural that such changes and modifications belong to the appended claims.

The invention claimed is:

1. A transport basket for transporting defective spent nuclear fuel of a heavy water reactor, the transport basket comprising:

a basket body provided with an accommodation space and an internal support partitioning the accommodation space;

a fuel pocket pivotably arranged in each side of the accommodation space partitioned by the internal support and provided with a groove opened upwards;

a fuel case configured to accommodate spent nuclear fuel and to be detachably seated therein in the groove of the fuel pocket; and a lid screw-coupled to the basket body to open and close the accommodation space of the basket body, wherein the lid is provided with a central through hole, the internal support is provided with a hollow central post to be exposed to the outside of the lid through the central through hole, the hollow central post has the inside open through the central through hole, and the circumference of the hollow central post has a plurality of exhaust holes through which the accommodation space and the inside of the hollow central post communicate.

2. The transport basket of claim 1, wherein the basket body is provided with a plurality of screw grooves provided on an upper rim thereof, and the lid is provided with fastening holes corresponding to positions of the screw grooves, wherein the fastening holes are arc-shaped long holes provided in a circumferential direction of the lid.

3. The transport basket of claim 1, further comprising a support arranged in the accommodation space for supporting the fuel pocket to be sloped in a pivot direction of the fuel pocket.

4. The transport basket of claim 1, further comprising a shielding adapter provided with a seating groove having an inner diameter corresponding to an outer diameter of the basket body and a support portion to separate the seating groove from the ground, wherein the lid and the shielding adapter are to be screw-fastened with each other.

5. The transport basket of claim 1, wherein the fuel case comprises a guider having partition spaces partitioned into a plurality of spaces, thereby allowing the spent nuclear fuel to be accommodated in the partition space in a rod unit.

6. The transport basket of claim 1, wherein the lid comprises:

a fastening piece configured to be screw-fastened to a rim of the basket body; and a close contact protrusion provided to correspond to an inner diameter of the accommodation space of the basket body, protruding downward from a center of the lid to be in close contact with the internal support, and provided with the central through hole to allow the hollow central post to be inserted therein.

* * * * *